United States Patent Office 2,894,995
Patented July 14, 1959

1

2,894,995

CONDENSATION OF AROMATIC HYDROCARBONS WITH POLYCHLOROOLEFINS

Louis Schmerling, Riverside, Ill., assignor, by mesne assignments, to Universal Oil Products Company, Des Plaines, Ill., a corporation of Delaware No Drawing. Application August 1, 1957
Serial No. 675,554

17 Claims. (Cl. 260—651)

This application is a continuation-in-part of my copending application Serial No. 354,878, filed May 13, 1953, now abandoned, which is itself a continuation-in-part of my co-pending application Serial No. 234,441, filed June 29, 1951, now abandoned.

This invention relates to the interaction of polychloroolefins with aromatic hydrocarbons having attached to a nuclear carbon atom a carbon atom of a saturated hydrocarbon group to which last named carbon atom is attached at least one hydrogen atom. More particularly, the process relates to the side chain chlorovinylation of an alkylaromatic compound with a polychloroolefin in the presence of a catalyst which generates free radicals at the operating conditions.

One embodiment of this invention relates to a process which comprises forming a mixture of reactants consisting of a polychloroolefin having at least one chlorine atom attached to each of the doubly bonded carbon atoms, an aromatic hydrocarbon having attached to a nuclear carbon atom a carbon atom of a saturated hydrocarbon group to which last named carbon atom is attached at least one hydrogen atom, and a free radical generating catalyst, and reacting the polychloroolefin with the aromatic hydrocarbon by heating said mixture to a condensation temperature of from about 50° to about 300° C. and at least as high as the decomposition temperature of the catalyst, and at a pressure of from about atmospheric to about 100 atmospheres such that a subsantial proportion of the reactants is in the liquid phase.

Another embodiment of this invention relates to a process which comprises forming a mixture of reactants consisting of a polychloroolefin having at least one chlorine atom attached to each of the doubly bonded carbon atoms, an aromatic hydrocarbon having attached to a nuclear carbon atom a carbon atom of a saturated hydrocarbon group to which last named carbon atom is attached at least one hydrogen atom, and a peroxy compound catalyst, and reacting the polychloroolefin with the aromatic hydrocarbon by heating said mixture to a condensation temperature of from about 50° to about 300° C. and at least as high as the decomposition temperature of the catalyst, and at a pressure of from about atmospheric to about 100 atmospheres such that a substantial proportion of the reactants is in the liquid phase.

A further embodiment of this invention relates to a process which comprises forming a mixture of reactants consisting of a polychloroolefin having at least one chlorine atom attached to each of the doubly bonded carbon atoms, an aromatic hydrocarbon having attached to a nuclear carbon atom a carbon atom of a saturated hydrocarbon group to which last named carbon atom is attached at least one hydrogen atom, and an organic peroxide catalyst, and reacting the polychloroolefin with the aromatic hydrocarbon by heating said mixture to a condensation temperature of from about 50° to about 300° C. and at least as high as the decomposition temperature of the catalyst, and at a pressure of from about atmospheric to about 100 atmospheres such that a substantial proportion of the reactants is in the liquid phase.

A still further embodiment of this invention relates to a process which comprises forming a mixture of reactants consisting of a polychloroethylene having at least one chlorine atom attached to each of the doubly bonded carbon atoms, an alkylaromatic hydrocarbon having at least one hydrogen atom attached to the carbon atom of the alkyl group which is attached to a nuclear carbon atom, and an organic peroxide catalyst, and reacting the polychloroethylene with the alkylaromatic hydrocarbon by heating said mixture to a condensation temperature of from about 50° to about 300° C. and at least as high as the decomposition temperature of the catalyst, and at a pressure of from about atmospheric to about 100 atmospheres such that a substantial proportion of the reactants is in the liquid phase.

Aromatic hydrocarbons which are utilizable as starting materials in this process have attached to a nuclear carbon atom a carbon atom of a saturated hydrocarbon group to which last named carbon atom is attached at least one hydrogen atom. Thus the aromatic hydrocarbon has an alpha carbon atom attached to the aromatic nucleus to which alpha carbon atom is attached at least one hydrogen atom giving a structural unit which can be represented as follows:

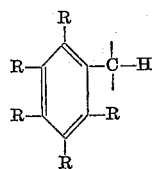

The free valences may be attached to hydrogen atoms, one of them may be attached to a hydrogen atom and the other may be attached to an alkyl group, they both may be attached to alkyl groups, one of them may be attached to a hydrogen atom and the other may be attached to or form part of a cycloalkane ring which may or may not be attached to a different nuclear carbon atom, or one may be attached to an alkyl group and the other to a cycloalkane ring, etc. Suitable aromatic hydrocarbons include toluene, ortho-xylene, meta-xylene, para-xylene, ethylbenzene, 1,2,3-trimethylbenzene 1,2,4-trimethylbenzene, 1,3,5-trimethylbenzene, ortho-ethyltoluene, meta-ethyltoluene, para-ethyltoluene, n-propylbenzene, isopropylbenzene, para-isopropyltoluene, n-butylbenzene, isobutylbenzene, sec-butylbenzene, etc. Tertiary-butyl benzene and similar compounds in which the alpha methyl carbon atom does not have at least one hydrogen atom attached thereto are inoperative and thus are excluded from the scope of this invention. Likewise, compounds such as benzene, naphthalene, etc. are inoperative. Higher molecular weight alkylaromatic hydrocarbons, such as those produced by the alkylation of aromatic hydrocarbons as benzene or toluene, with olefinic polymers, are also suitable, provided, of course, that the alpha methyl carbon atom contains at leas one hydrogen atom. In the structural formula set forth hereinabove, the aromatic nucleus is represented as containing substituents designated by the letter R. R may be hydrogen, alkyl, aryl, cycloalkyl, alkaryl, aralkyl, etc. The defined aromatic hydrocarbons having attached to a nuclear carbon atom a carbon atom of a saturated hydrocarbon group to which last named carbon atom is attached at least one hydrogen atom also include alkyl naphthalenes such as alpha-methyl-naphthalene, beta-methylnaphthalene, ethylnaphthalene, diethylnaphthalenes, etc. Also the aromatic hydrocarbons may contain both a benzene ring and a saturated ring such as found in tetralin and indan.

The polychloroolefins which may be reacted with an aromatic hydrocarbon in the presence of a free radical generating catalyst in accordance with the process of this invention comprise polychloroolefins containing a pair of doubly bonded carbon atoms and at least one chlorine atom attached to each of the doubly bonded carbon atoms. As is readily observed, this type of configuration still leaves one valence of each of the doubly bonded carbon atoms free, and these free valences may be taken up by substituents such as hydrogen atoms, halogen atoms including fluorine, chlorine, and bromine, an alkyl group such as methyl, ethyl, propyl, etc., and a haloalkyl group such as a fluoromethyl group, chloromethyl group, bromomethyl group, dichloromethyl group, chloroethyl group, trifluoromethyl group, etc. A preferred species of these polychloroolefins comprises polychloroethylenes, in which each of the doubly bonded carbon atoms has at least one chlorine atom attached thereto. Examples of suitable polychloroolefins include 1,2-dichloroethylene, trichloroethylene, 1 - fluoro - 1,2 - dichloroethylene, 1-bromo - 1,2 - dichloroethylene, tetrachloroethylene, 1,2-difluoro - 1,2 - dichloroethylene, 1,2 - dibromo - 1,2-dichloroethylene, 1 - fluoro - 2 - bromo - 1,2 - dichloroethylene, 1,2 - dichloro - 1 - propene, 1,1,2 - trichloro-1 - propene, 1,2,2 - trichloro - 1 - propene, 1,1,2,2-tetrachloro - 1 - propene, 1,2,3 -trichloro - 1 - propene, 1,2,3,3 - tetrachloro - 1 - propene, 1,2,3,3,3 -pentachloro-1 - propene, 1 - fluoro - 1,2 - dichloro - 1 - propene, 1,2-difluoro - 1,2 - dichloro - 1 - propene, 2 - fluoro - 1,2 - dichloro - 1 - propene, 1,2,3 - trifluoro - 1,2 - dichloro-1 - propene, 3,3,3 - trifluoro - 1,2 - dichloro - 1 - propene, 1,2 - dichloro - 3 - fluoro - 1 - propene, 1 - bromo - 1,2-dichloro - 1 - propene, 2 - bromo - 1,2 - dichloro - 1-propene, 3 - bromo - 1,2 -dichloro - 1 - propene, 1,2-dibromo - 1,2 - dichloro - 1 -propene, 1,3 - dibromo-1,2 -dichloro - 1 - propene, 2,3 - dibromo - 1,2 -dichloro-1 -propene, 1,2 - dichloro - 1 - butene, 2,3 - dichloro-2 -butene, 1,2 - dichloro - 2-methyl - 1 - propene, 1,1,2-trichloro - 1 - butene, 1,2,2 -trichloro - 1 - butene, 1,1,2,2 - tetrachloro - 1 - butene, 2,2,3 - trichloro - 2-butene, 2,2,3,3 - tetrachloro - 1 - butene, 1,1,2 - trichloro - 2 -methyl - 1 - propene, 1,2 -dichloro - 1 - pentene, 2,3 -dichloro - 2 - pentene, 1,2 - dichloro - 1-hexene, 2,3 - dichloro - 2 - hexene, 3,4 - dichloro - 3-hexene, 1,2 - dichloro - 1 - heptene, 1,2 - dichloro - 1-octene, 1,2 -dichloro - 1 - nonene, 1,2 - dichloro - 1 - decene, etc. It is essential that the polychloroolefins contain at least two chlorine atoms per molecule since monochloroolefins do not give a condensation reaction of the type herein described. Similarly polyhaloolefins other than polychloroolefins containing at least one chlorine atom on each of the doubly bonded carbon atoms do not give reactions of the type described herein. For example, 1,2-dibromoethylene as well as tribromoethylene are inoperative in the process of the present invention. As set forth hereinabove polychloroolefins such as 3,3,3-trifluoro-1,2-dichloro-1-propene that contain one or more fluorine atoms may be used in this process since the fluorine atoms in such compounds do not noticeably affect the activity of the chlorine atoms. Likewise, one or more fluorine atoms may be attached to the doubly bonded carbon atoms provided that the above mentioned requirement for chlorine atoms attached to the doubly bonded carbon atoms is met.

The catalysts that may be used in the process of the present invention are those which are capable of forming free radicals under the reaction conditions. These include diazonium compounds, metal alkyls, and peroxy compounds. Peroxy compounds contain the bivalent radical —O—O— which decomposes to form free radicals which initiate the general reaction of the present invention. Examples of such peroxy compounds are the persulfates, perborates, percarbonates, of the amonium and of the alkali metals; peracetic acid, persuccinic acid, dimethyl peroxide, diethyl peroxide, di-tert-butyl peroxide, di-propyl peroxide, acetyl benzoyl peroxide, propionyl peroxide, butyryl peroxide, lauroyl peroxide, benzoyl peroxide, tetralin peroxide, urea peroxide, tertiary-butyl perbenzoate, tertiary-butyl hydroperoxide, methylcyclohexyl hydroperoxide, 2,4 - dichlorobenzoyl peroxide, methylethylketone peroxide, cyclohexanone peroxide, cumene hydroperoxide, diisopropylbenzene hydroperoxide, paramenthane hydroperoxide, isopropyl percarbonate, etc. The organic peroxy compounds constitute a preferred class of catalysts for use in this invention. Mixtures of peroxy compound catalysts may be employed or the peroxy compound catalysts may be utilized in admixture with various diluents as catalysts for the process of this invention. Thus organic peroxy compounds which are compounded commercially with various diluents for use as free radical generating catalysts may be used and include benzoyl peroxide compounded with calcium sulfate, benzoyl peroxide compounded with camphor, benzoyl peroxide compounded with hydrogenated terphenyls, benzoyl peroxide compounded with stearic acid, benzoyl peroxide compounded with tricresyl phosphate, benzoyl peroxide compounded with dibutyl phthalate, methylethylketone peroxide in dimethylphthalate, cyclohexanone peroxide with dibutyl phthalate, acetyl peroxide in dimethylphthalate, etc. Only catalytic amounts (less than stoichiometric amounts) need be used in the process.

The condensation of polychloroolefins with alkylaromatic hydrocarbons is illustrated by the following equations showing the condensation of one molecular proportion of toluene with one molecular proportion of 1,2-dichloroethylene in the presence of an organic peroxide catalyst such as di-tert-butyl peroxide and the evolution of one molecular proportion of hydrogen chloride, and also the condensation of one molecular proportion of ethylbenzene with one molecular proportion of trichloroethylene in the presence of an organic peroxide catalyst such as benzoyl peroxide and evolution of one molecular proportion of hydrogen chloride.

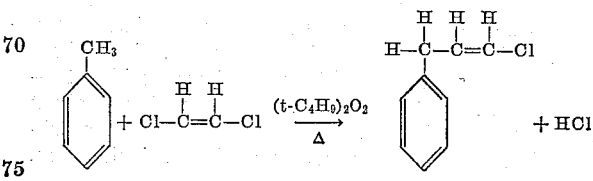

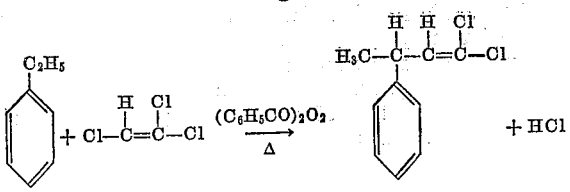

The compositions produced by the above reactions are in many instances new compositions of matter. They will undergo many of the reactions of monochloroolefins and can be condensed with dienes, cycloalkadienes, or hexachlorocyclopentadiene to form further new compositions of matter.

Hydrogen chloride is evolved in the condensation reactions herein disclosed in a quantity of one molecular proportion of hydrogen chloride per one molecular proportion of desired product. In cases where it is desirable to avoid radical changes in pH during the course of the reaction, small amounts of the materials which have a buffering effect on the pH may be included in the reaction mixture. For example, an alkaline pH can be maintained by the use of buffers such as borax, disodium phosphate, sodium carbonate, ammonium carbonate, sodium acetate, etc.

The process of this invention may be carried out in batch operation by placing a quantity of the aromatic hydrocarbon and the free radical generating catalyst in a reactor equipped with a mixing device, adding the polychloroolefin, heating to a preselected reaction temperature while mixing the contents of the reactor, cooling after a suitable period of time, and recovering the condensation products.

The preferred method of operation is of the continuous type. In this method of operation the alkylaromatic hydrocarbon, the polychloroolefin, and the catalyst are continuously charged to a reactor maintained at suitable conditions of temperature and pressure. The reactor may be an unpacked vessel or coil, or it may contain an adsorbent packing material such as fire brick, alumina, dehydrated bauxite, and the like. The condensation products are separated from the reactor effluent, and the unconverted starting materials may be recycled to the reaction zone. The unreacted materials are lower boiling than the condensation products and thus are readily recoverable by conventional means such as fractionation for purposes of recycle. In the continuous method of carrying out this process, the reactants are added continuously to the reaction zone, but if desired they may be added intermittently.

In selecting a particular reaction temperature for use in the process of the present invention, two considerations must be taken into account. First, sufficient energy by means of heat must be applied to the reaction system so that the reactants, namely the selected aromatic hydrocarbon and polychloroolefin, will be activated sufficiently for condensation to take place when free radicals are generated by the catalyst. Second, free radical generating catalysts such as peroxy compounds, particularly organic peroxides, decompose at a measurable rate with time in a logarithmic function dependent upon temperature. This rate of decomposition can be and ordinarily is expressed as the half life of a peroxide at a particular temperature. For example, the half life in hours for di-tert-butyl peroxide is 17.5 hours at 125° C., 5.3 hours at 135° C., and 1.7 hours at 145° C. (calculated from data for the first 33% decomposition). A reaction system temperature must then be selected so that the free radical generating catalyst decomposes smoothly with the generation of free radicals at a half life which is not too long. In other words, sufficient free radicals must be present to induce the present chain reaction to take place, and these radicals must be formed at a temperature at which the reactants are in a suitably activated state for condensation. When the half life of the free radical generating catalyst is greater than 10 hours, radicals are not generated at a sufficient rate to cause the reaction of the process of the present invention to go forward at a detectable rate. Thus the reaction temperature may be within the range of from about 50° to about 300° C. and at least as high as the decomposition temperature of the catalyst, by which is meant a temperature such that the half life of the free radical generating catalyst it not greater than 10 hours. Since the half life for each free radical generating catalyst is different at different temperatures, the exact temperature to be utilized in a particular reaction will vary. However, persons skilled in the art are well acquainted with the half life vs. temperature data for different free radical generating catalysts and thus it is within the skill of one familiar with the art to select the particular temperature needed for any particular catalyst. Generally the operating temperature does not exceed the temperature at which the half life is not more than 10 hours by more than about 150° C. since free radical generating catalysts decompose rapidly under such conditions. However, in some instances temperatures as high as 300° C. may be utilized, for example, when a reactor is charged with the desired polychloroolefin and the free radical generating catalyst in solution in the desired alkylaromatic hydrocarbon is introduced under and by means of pressure as a liquid under the surface of the polychloroolefin maintained at the high temperature. The half life of tert-butyl perbenzoate is less than 10 hours at about 110° C., and accordingly when this peroxy compound is used as the catalyst for this process, the operating temperature is from about 110° C. to about 300° C., but generally not greater than about 265° C. An operating temperature of from about 130° C. to about 300° C. is used with a di-tert-butyl peroxide, and from about 75° to about 300° C., but generally not greater than about 225° C. with benzoyl peroxide. Little advantage is gained if the temperature is too high even though the reactants tend to become more activated in the presence of the free radical generating catalyst decomposing at a high rate since decomposition of the polychloroolefin takes place at temperatures above about 300° C.

Although pressures of up to 100 atmospheres may be utilized, the reaction preferably takes place in liquid phase and thus the pressure will preferably range from about atmospheric to about 100 atmospheres such that a substantial proportion of the reactants is in the liquid phase. Pressure is not an important variable in the process of this invention. However, because of the low boiling points of some of the reactants it is necessary to utilize pressure withstanding equipment to insure liquid phase conditions. In batch type operations it is often desirable to utilize pressure withstanding equipment, to charge the reactants and catalyst to the vessel, and to pressure the vessel with 10, or 30, or 50 or more atmospheres with an inert gas such as nitrogen. This helps to insure the presence of liquid phase conditions. However, when the mole quantity of reactants is sufficient, the pressure which they themselves generate at the temperature utilized is sufficient to maintain the desired phase conditions. Nitrogen is also conveniently utilized when a glass liner is used along with pressure withstanding equipment. Since the nitrogen is pressured into the vessel prior to heating, it tends to maintain the reactants within the glass liner and thus aids in their removal after the passage of the desired period of time at the reaction temperature selected.

The concentration of the catalyst employed in this process may vary over a rather wide range but for reasons of economy it is desirable to use low concentrations of catalyst, such as from about 0.1% to about 10% of the total weight of the polychloroolefin and aromatic hydrocarbon charged to the process. The reaction time may be within the range of less than one minute to several hours, depending upon temperature and half life of the free radical generating catalyst, as set forth hereinabove. Generally, contact times of at least 10 minutes are preferred.

The aryl chloroolefins formed in the process of this invention are in many instances new compositions of matter. As such they may be used for the preparation of polymers, resins, pharmaceuticals, and in the synthesis of diverse organic chemicals. Some of them are useful per se as pesticides. They also may be reacted with hexachlorocyclopentadiene in the familiar Diels-Alder type reaction to form chlorinated bicycloheptenes which have insecticidal properties. The aryl chloroolefins formed by the process of this invention may be sulfated or the aromatic nucleus may be sulfonated to form materials which are surface active agents such as wetting agents or detergents.

The following example is introduced to illustrate the generally broad scope of the invention with no intention of unduly limiting this broad scope.

EXAMPLE I

Toluene, ethylbenzene, and indan were reacted with trans-dichloroethylene, trichloroethylene, tetrachloroethylene, and trifluoromethyl-1,2-dichloroethylene in glass lined rotating autoclaves of 850 cc. capacity in the presence of di-tert-butyl peroxide and tert-butyl perbenzoate as the free radical generating catalysts. The specific reactants, quantities thereof, and equimolecular condensation product obtained are summarized in Table I. The experiments utilizing di-tert-butyl peroxide as the catalyst were carried out at a temperature of 130–140° C. since it was found that the reactants were satisfactorily activated at this temperature and that the half life of the peroxide was not greater than 10 hours at this temperature. This, of course, does not mean that higher temperature could not be utilized with suitable modification in the equipment. One experiment, Run 4, was carried out with tert-butyl perbenzoate as the free radical generating catalyst at a temperature of 110–115° C. where the reactants were found to be sufficiently activated and the peroxide decomposing at a satisfactory rate. Higher temperatures could also be used with these reactants with suitable modification of the equipment. After charging the reactants and catalyst to the autoclave in the glass liner, the autoclave was sealed and 30 atmospheres of nitrogen was then pressured into the autoclave. The purpose of this nitrogen pressure was simply to insure that the reactants and catalyst remained in contact with one another inside the glass liner. Had the glass liner not been utilized, pressures ranging from atmospheric to about 100 atmospheres could have been utilized, depending upon the boiling points and molar quantities of the particular reactants. Upon heating to reaction temperature the pressure in the autoclave increased 20–30 atmospheres due to expansion of the nitrogen and vaporization of a portion of the reactants. This meant that the total pressure at reaction temperature was in the neighborhood of 50–60 atmospheres for each of the above experiments, most of this pressure being due to the nitrogen which was simply utilized as an aid in keeping the reactants and decomposing peroxide inside the glass liner so that the product along with unreacted starting materials could be readily recovered at the end of the reaction. The autoclaves were generally heated for 4 hours' time after which they were cooled to room temperature, the glass liners removed, and the products separated by fractional distillation to recover unconverted starting material from the condensation products.

The reactions which take place between the alkyl-aromatic hydrocarbons and polychloroolefins may be explained by means of a free radical chain mechanism. This mechanism not only includes the initiation of the reaction by means of the free radical generating catalyst, but also explains the formation of higher molecular weight products due to reaction of more than one alpha hydrogen atom with the polychloroolefin. The mechanism of the peroxide-induced reaction of toluene with trans-dichloroethylene may be written as follows:

(1) Decomposition of di-tert-butyl peroxide to tert-butoxy free radicals:

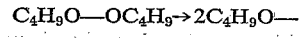

(2) Reaction of tert-butoxy radicals with toluene:

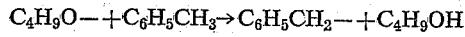

(3) Addition of benzyl radicals to dichloroethylene:

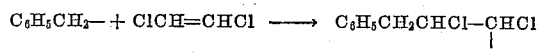

(4) Elimination of a chlorine atom:

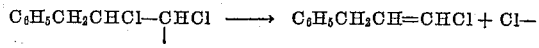

(5) Reaction of the chlorine atom with toluene:

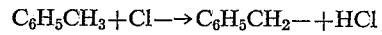

The benzyl radical formed in step 5 reacts with dichloroethylene as in step 3 and starts a new cycle. The reactions of steps 1 and 2 serve only as chain initiators. In steps 4 and 5 a chlorine atom is eliminated which reacts with toluene to form a benzyl radical which continues the chain. However, this chlorine radical can also react with the primary product as follows:

(6) Reaction of chlorine atom with (3-chloroallyl)-benzene:

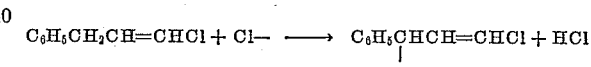

(7) Addition of (3-chloroallyl)-benzene radical to dichloroethylene:

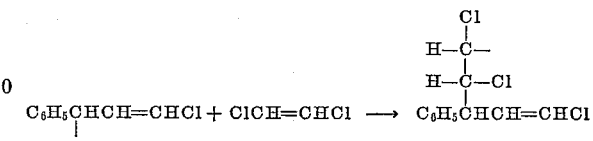

(8) Elimination of a chlorine atom:

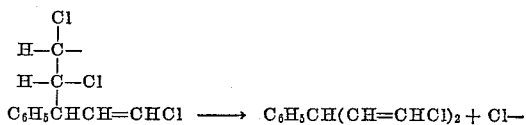

The di-chlorovinylated toluene can again react to form further high boiling material. The formation of these higher boiling products decreases the yield based upon the chloroolefin consumed. However, in all cases a substantial proportion of chloroolefin was recovered and is available for recycle purposes. Likewise, the excess toluene, when used, and unreacted toluene were recovered by distillation and are available for recycle.

The benzyl radicals formed in step 5 also may react with one another to form dibenzyl as a chain stopping step.

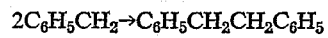

Table I
REACTION OF AROMATIC HYDROCARBONS WITH HALOETHYLENES

| Run No. | Reactants ArH, Mols | $X_mH_{2-m}C=CX_nH_{2-n}$ Kind [a] | $X_mH_{2-m}C=CX_nH_{2-n}$ Mols | $R_2O_2$ [b] Mols | Temp., °C. | Equimolecular Condensation Product Formula | Approx., g. | Percent on Polychloroethylene reacted | Higher, g. |
|---|---|---|---|---|---|---|---|---|---|
| | | | | | | *Toluene with Chloroethylenes* | | | |
| 1 | 1.02 | Cl₂ | 0.50 | 0.055 | 130–140 | PhCH₂CH=CHCl | 14 | 63.5 | 9 |
| 2 | 1.02 | Cl₃ | 0.50 | 0.055 | 130–140 | PhCH₂CH=CCl₂ | 22 | 50 | 16 |
| 3 | 1.08 | Cl₄ | 0.30 | 0.055 | 130–140 | PhCH₂CCl=CCl₂ | 30 | 85 | 6 |
| 4 | 1.11 | Cl₄ | 0.32 | [c] 0.041 | 110–115 | PhCH₂CCl=CCl₂ | 18 | 47 | 5 |
| | | | | | | *Ethylbenzene with Chloroethylenes* | | | |
| 5 | 0.48 | Cl₂ | 0.41 | 0.055 | 130–140 | PhCHMeCH=CHCl | 12 | 48 | 9 |
| 6 | 0.67 | Cl₃ | 0.40 | 0.075 | 130–140 | PhCHMeCH=CCl₂ | 24 | 72 | 11 |
| | | | | | | *Benzene with Trichloroethylene* | | | |
| 7 | 1.01 | Cl₂ | 0.50 | 0.055 | 130–140 | (CHCl=CCl₂)₂ | 19 | 14 | 10 |
| | | | | | | *Indan with Chloroethylenes* | | | |
| 8 | 0.77 | Cl₂ | 0.52 | 0.055 | 130–140 | C₈H₈CHCH=CHCl | 17 | 84 | 13 |
| 9 | 0.80 | Cl₃ | 0.38 | 0.055 | 130–140 | C₈H₈CHCH=CCl₂ | 27 | 67 | 13 |
| | | | | | | *Toluene with 1,2-Dibromoethylene* | | | |
| 10 | 0.27 | Br₂ | 0.20 | 0.028 | 130–140 | Tar | 3 | | |
| | | | | | | *Toluene with Trifluoromethyl-1,2-Dichloroethylene* | | | |
| 11 | 0.87 | Cl₂ | 0.25 | 0.055 | 130–140 | PhCH₂—CH=CCl—CF₃ | 13 | 98 | 12.5 |
| | | | | | | *t-Butylbenzene with Trichloroethylene* | | | |
| 12 | 0.56 | Cl₃ | 0.38 | 0.041 | 130–140 | No Plateau | | | 30 |
| | | | | | | *t-Pentylbenzene with Trichloroethylene* | | | |
| 13 | 0.20 | Cl₃ | 0.18 | 0.034 | 130–140 | No Plateau | | | 12 |

[a] Cl₂ represents trans-dichloroethylene, Cl₃ represents trichloroethylene, Cl₄ represents tetrachloroethylene and Br₂ represents 1,2-dibromoethylene.
[b] Di-t-butyl peroxide unless otherwise noted.
[c] t-Butyl perbenzoate.

*Run 1.—Toluene and trans-dichloroethylene.*—Toluene was successfully condensed with trans-dichloroethylene in the presence of di-tert-butyl peroxide to produce (3-chloroallyl)-benzene. This experiment was carried out by charging 94 grams of toluene, 49 grams of trans-dichloroethylene and 8 grams of di-tert-butyl peroxide to a rotating autoclave which was then sealed, and 30 atmospheres of nitrogen added thereto. The nitrogen was added solely for the purpose of maintaining the reactants in contact with one another in the glass liner in the autoclave. Heating of the autoclave was initiated and when a temperature of about 130–140° C. was reached, the temperature was maintained for about 4 hours' time. Due to the heating, the pressure in the autoclave went up to about 55–60 atmospheres. The heating was stopped, and the autoclave cooled to room temperature and the pressure released. The contents of the autoclave, after neutralization of the hydrogen chloride produced, were transferred into a distilling flask for recovery of unreacted starting materials and desired product.

Upon distillation 35 grams of the trans-dichloroethylene and 74 grams of toluene were recovered as unreacted starting materials suitable for recycle. On the basis of the trans-dichloroethylene which reacted, a 63.5% yield of (3-chloroallyl)-benzene was obtained. In addition to the 63.5% yield which amounted to 14 grams, there was also recovered 9 grams of bottoms which undoubtedly contained the reaction product of 2 moles of trans-dichloroethylene with 1 mole of toluene, that is, alpha, alpha-di-(2-chlorovinyl)-toluene. Furthermore, dibenzyl, the chain stopper for the reaction also occurs in this bottoms fraction.

The (3-chloroallyl)-benzene produced in this reaction was characterized by comparing its infrared spectrum with that of the product prepared by the reaction of benzene with 1,3-dichloropropene in the presence of aluminum chloride dissolved in nitromethane.

*Run 2.—Toluene and trichloroethylene.*—The experimental procedure for this run and the following runs was carried out in substantially the same manner as described hereinabove in Run 1. In this run there was charged to the autoclave 94 grams of toluene, 65 grams of trichloroethylene and 8 grams of di-tert-butyl peroxide. The reaction was carried out at 130–140° C. and under nitrogen pressure as shown in Run 1. Upon distillation of the product there was recovered 68 grams of toluene and 34 grams of trichloroethylene. The 22 grams of (3,3-dichloroallyl)-benzene which was obtained represents a 50% yield based on the trichloroethylene which reacted. There was also obtained 16 grams of bottoms representing di-substituted toluene and dibenzyl, the latter being the chain stopper for the reaction.

*Run 3.—Toluene and tetrachloroethylene.*—In this experiment 100 grams of toluene, 50 grams of tetrachloroethylene, and 8 grams of di-tert-butyl peroxide were charged to the autoclave. From the reaction products there was recovered 67.5 grams of toluene and 24.5 grams of tetrachloroethylene. The 30 grams of (2,3,3-trichloroallyl)-benzene which was obtained represents an 85% yield based on the tetrachloroethylene which reacted.

*Run 4.—Toluene and tetrachloroethylene.*—In this experiment 102 grams of toluene, 53 grams of tetrachloroethylene, and 8 grams of tert-butyl perbenzoate were charged to the reactor. Instead of the 130–140° C, temperature which is utilized with di-tert-butyl peroxide, this experiment was carried out at 110–115° C. where the half life of the tert-butyl perbenzoate is less than 10 hours so that the reaction will proceed at a satisfactory rate. From the reaction products there was recovered 71 grams of toluene and 24.4 grams of tetrachloroethylene. The 18 grams of (2,3,3-trichloroallyl)-benzene which was obtained as the product represents a 47% yield based upon the tetrachloroethylene which reacted.

*Run 5.—Ethylbenzene and trans-dichloroethylene.*—In this experiment 51 grams of ethylbenzene, 40 grams of trans-dichloroethylene, and 8 grams of di-tert-butyl peroxide were charged to the autoclave reactor. From the reaction products there was recovered 30.4 grams of ethylbenzene and 25.4 grams of trans-dichloroethylene. The 12 grams of 1-chloro-3-phenyl-1-butene which was recovered as the product by fractional distillation represents a 48% yield based upon the dichloroethylene which reacted.

*Run 6.—Ethylbenzene and trichloroethylene.*—In this experiment 71 grams of ethylbenzene, 53 grams of trichloroethylene and 8 grams of di-tert-butyl peroxide were charged to the autoclave reactor. Upon distillation of the reactor products there was obtained 52 grams of ethylbenzene and 22 grams of trichloroethylene. The 24 grams of 1,1-dichloro-3-phenyl-1-butene which was obtained as the product represents a 72% yield based upon the trichloroethylene which reacted.

*Run 7.—Benzene and trichloroethylene.*—When an attempt was made to condense benzene with trichloroethylene in the presence of di-tert-butyl peroxide at 130–140° C., the only reaction product which was isolated was the dimer of trichloroethylene which was obtained in a 14% yield. This result indicates that the hydrogen atom in the alkyl group which is attached to the alpha methyl carbon atom to the aromatic nucleus is necessary to obtain the type of condensation herein described.

*Run 8.—Indan and trans-dichloroethylene.*—In this experiment 91 grams of indan, 50 grams of trans-dichloroethylene and 8 grams of di-tert-butyl peroxide were charged to the autoclave reactor. From the reaction products there was recovered 79 grams of indan and 38.8 grams of trans-dichloroethylene, suitable for recycle. The 17 grams of 1-(2-chlorovinyl)-indan which was obtained as the equipmolecular condensation product represents an 84% yield based upon the trans-dichloroethylene which reacted.

*Run 9.—Indan and trichloroethylene.*—In this experiment 92 grams of indan, 50 grams of trichloroethylene, and 8 grams of di-tert-butyl peroxide were charged to the autoclave reactor. Upon fractional distillation of the reactor effluent, there was obtained 60 grams of indan and 25 grams of trichloroethylene, suitable for recycle or reuse in the process. The 27 grams of 1-(2,2-dichlorovinyl)-indan which was obtained as the equimolecular condensation product represents a 67% yield based upon the trichloroethylene which reacted.

*Run 10.—Toluene and 1,2-dibromoethylene.*—In this experiment an attempt was made to see whether or not the halogen atoms attached to the substituted ethylene compound could be other than chlorine atoms. Thus an attempt was made to react toluene with 1,2-dibromoethylene in the presence of di-tert-butyl peroxide at 130–140° C. No identifiable product was obtained, the higher boiling material representing about 3 grams of tar. On the basis of this result it was concluded that the polyhaloolefin utilized must contain at least one chlorine atom attached to each of the doubly bonded carbon atoms. This finding is in accordance with previously published data on the activation energies needed for reaction of different halogens where it is shown that free radical reactions of chlorinated compounds are slightly exothermic in contrast to bromine and iodine compounds which are endothermic, the iodine compounds being more strongly endothermic.

*Run 11.—Toluene and 1,2-dichloro-3,3,3-trifluoro-1-propene.*—In this experiment 80 grams of toluene, 41 grams of 1,2-dichloro-3,3,3-trifluoro-1-propene (which may also be named trifluoromethyl -1,2-dichloroethylene) and 8 grams of di-tert-butyl peroxide were charged to the autoclave reactor. After completion of the designated time at the reaction temperature of 130–140° C., there was recovered unreacted 63.3 grams of toluene and 31 grams of 1,2-dichloro-3,3,3-trifluoro-1-propene. The 13 grams of (1-chloro-1-trifluoromethylallyl)-benzene (or 1,1,1-trifluoro-2-chloro-4-phenyl-2-butene as it may also be named) which was obtained as the product represents a 98% yield based upon the 1,2-dichloro-3,3,3-trifluoro-1-propene which reacted.

*Run 12.—Tert-butylbenzene and trichloroethylene.*—Tert-butylbenzene is an alkylaromatic hydrocarbon which does not contain at least one hydrogen atom on the carbon atom of the alkyl group which is attached to the aromatic nucleus. In the experiment 75 grams of tert-butylbenzene, 50 grams of trichloroethylene, and 6 grams of di-tert-butyl peroxide were charged to the autoclave reactor which after sealing was heated to 130–140° C. Fractional distillation of the reaction product yielded substantially all of the starting materials back unreacted.

*Run 13.—Tert-pentylbenzene and trichloroethylene.*—This experiment again illustrated the necessity for the presence of at least one hydrogen atom on the carbon atom of the alkyl group which is attached to the aromatic nucleus. In this experiment 30 grams of 2-methyl-2-phenyl butane, 25 grams of trichloroethylene, and 5 grams of di-tert-butyl peroxide were charged to the autoclave reactor. After heating for 4 hours at 130–140° C. and cooling, the reaction products were distilled. Substantially all of the starting materials were recovered unchanged, again indicating the necessity for the presence of an alpha hydrogen atom for the condensation reaction of the present invention.

EXAMPLE II

This example was carried out to illustrate the fact that pressure is not an important variable in the process of the present invention. Whereas the prior described experiments were carried out under nitrogen pressure for convenience sake, this experiment was carried out at atmospheric pressure and at the reflux temperature of toluene and trichloroethylene, namely 95°–110° C. A mixture of 92 grams of toluene, 65 grams of trichloroethylene, and 5 grams of benzoyl peroxide was charged to a glass flask. The mixture in the flask was heated under reflux at atmospheric pressure to 95° C. at which temperature the mixture began to boil and hydrogen chloride evolution was noted. The temperature rose to 104° C. in 20 minutes after which the heating was stopped and the mixture allowed to cool overnight. The next morning 3 grams of additional benzoyl peroxide was added and the reaction mixture was again heated under reflux for 2 hours during which time the temperature rose from about 104° C. to about 110° C. The mixture was cooled, 3 grams of benzoyl peroxide was added, and the resulting mixture was again heated for an additional 1.5 hours during which time the temperature rose to 109° C. The product was then cooled, washed with water and dilute alkali, dried, and distilled. From the hydrocarbon layer there was obtained 80 grams of unreacted toluene and 36 grams of unreacted trichloroethylene, both of which are suitable for recycle in a continuous process. Also obtained was 16 grams of (3,3-dichloroallyl)-benzene which is equivalent to a 39% yield based on the trichloroethylene which reacted.

I claim as my invention:

1. A process which comprises forming a mixture of reactants consisting of a polychloroolefin consisting of carbon atoms and containing from 2 to 10 carbon atoms chlorine atom attached to each of the doubly bonded carbon atoms and containing from 2 to 10 carbon atoms per molecule, an aromatic hydrocarbon having attached to a nuclear carbon atom a carbon atom of a saturated hydrocarbon group to which last named carbon atom is attached at least one hydrogen atom, and a free radical generating catalyst, said hydrocarbon being selected from the group consisting of benzene and naphthalene derivatives and having only saturated hydrocarbon substitution, and reacting the polychloroolefin with the aromatic hydrocarbon by heating said mixture to a condensation temperature of from about 75° to about 300° C. and at least as high as the decomposition temperature of the catalyst, and at a pressure of from about atmospheric to about 100 atmospheres such that a substantial proportion of the reactants is in the liquid phase.

2. A process which comprises forming a mixture of reactants consisting of a polychloroolefin consisting of carbon, hydrogen and halogen and having at least one chlorine atom attached to each of the doubly bonded carbon atoms and containing from 2 to 10 carbon atoms per molecule, an aromatic hydrocarbon having attached to a nuclear carbon atom a carbon atom of a saturated hydrocarbon group to which last named carbon atom is attached at least one hydrogen atom, and a peroxy compound catalyst, said hydrocarbon being selected from the group consisting of benzene and naphthalene derivatives and having only saturated hydrocarbon substitution, and reacting the polychloroolefin with the aromatic hydrocarbon by heating said mixture to a condensation temperature of from about 75° to about 300° C. and at least as high as the decomposition temperature of the catalyst, and at a pressure of from about atmospheric to about 100 atmospheres such that a substantial proportion of the reactants is in the liquid phase.

3. A process which comprises forming a mixture of reactants consisting of a polychloroolefin consisting of carbon, hydrogen and halogen and having at least one chlorine atom attached to each of the doubly bonded carbon atoms and containing from 2 to 10 carbon atoms per molecule, an aromatic hydrocarbon having attached to a nuclear carbon atom a carbon atom of a saturated hydrocarbon group to which last named carbon atom is attached at least one hydrogen atom, said hydrocarbon being selected from the group consisting of benzene and naphthalene derivatives and having only saturated hydrocarbon substitution, and an organic peroxide catalyst, and reacting the polychloroolefin with the aromatic hydrocarbon by heating said mixture to a condensation temperature of from about 75° to about 300° C. and at least as high as the decomposition temperature of the catalyst, and at a pressure of from about atmospheric to about 100 atmospheres such that a substantial proportion of the reactants is in the liquid phase.

4. A process which comprises forming a mixture of reactants consisting of a polychloroalkene consisting of carbon, hydrogen and chlorine and having at least one chlorine atom attached to each of the doubly bonded carbon atoms and containing from 2 to 10 carbon atoms per molecule, an aromatic hydrocarbon having attached to a nuclear carbon atom a carbon atom of a saturated hydrocarbon group to which last named carbon atom is attached at least one hydrogen atom, and an organic peroxide catalyst, said hydrocarbon being selected from the group consisting of benzene and naphthalene derivatives and having only saturated hydrocarbon substitution, and reacting the polychloroalkene with the aromatic hydrocarbon by heating said mixture to a condensation temperature of from about 75° to about 300° C. and at least as high as the decomposition temperature of the catalyst, and at a pressure of from about atmospheric to about 100 atmospheres such that a substantial proportion of the reactants is in the liquid phase.

5. A process which comprises forming a mixture of reactants consisting of a polychloroethylene having at least one chlorine atom attached to each of the doubly bonded carbon atoms, an alkyl benzene hydrocarbon a saturated hydrocarbon having attached to a nuclear carbon atom a carbon atom of an alkyl group to which last named carbon atom is attached at least one hydrogen atom, and a free radical generating catalyst, and reacting the polychloroethylene with said hydrocarbon by heating said mixture to a condensation temperature of from about 75° to about 300° C. and at least as high as the decomposition temperature of the catalyst, and at a pressure of from about atmospheric to about 100 atmospheres such that a substantial proportion of the reactants is in the liquid phase.

6. A process which comprises forming a mixture of reactants consisting of a polychloroethylene having at least one chlorine atom attached to each of the doubly bonded carbon atoms, an alkyl benzene hydrocarbon a saturated hydrocarbon having attached to a nuclear carbon atom a carbon atom of an alkyl group to which last named carbon atom is attached at least one hydrogen atom, and peroxy compound catalyst, and reacting the polychloroethylene with said hydrocarbon by heating said mixture to a condensation temperature of from about 75° to about 300° C. and at least as high as the decomposition temperature of the catalyst, and at a pressure of from about atmospheric to about 100 atmospheres such that a substantial proportion of the reactants is in the liquid phase.

7. A process which comprises forming a mixture of reactants consisting of a polychloroethylene having at least one chlorine atom attached to each of the doubly bonded carbon atoms, an alkyl benzene hydrocarbon a saturated hydrocarbon having attached to a nuclear carbon atom a carbon atom of an alkyl group to which last named carbon atom is attached at least one hydrogen atom, and an organic peroxide catalyst, and reacting the polychloroethylene with said hydrocarbon by heating said mixture to a condensation temperature of from about 75° to about 300° C. and at least as high as the decomposition temperature of the catalyst, and at a pressure of from about atmospheric to about 100 atmospheres such that a substantial proportion of the reactants is in the liquid phase.

8. A process which comprises forming a mixture of reactants consisting of trans-dichloroethylene, an alkyl benzene hydrocarbon having only alkyl substitution and having at least one hydrogen atom attached to the carbon atom of the alkyl group which is attached to a nuclear carbon atom, and an organic peroxide catalyst, and reacting the trans-dichloroethylene with said hydrocarbon by heating said mixture to a condensation temperature of from about 75° to about 300° C. and at least as high as the decomposition temperature of the catalyst, and at a pressure of from about atmospheric to about 100 atmospheres such that a substantial proportion of the reactants is in the liquid phase.

9. A process which comprises forming a mixture of reactants consisting of trichloroethylene, an alkyl benzene hydrocarbon having only alkyl substitution and having at least one hydrogen atom attached to a carbon atom of the alkyl group which is attached to a nuclear carbon atom, and an organic peroxide catalyst, and reacting the trichloroethylene with said hydrocarbon by heating said mixture to a condensation temperature of from about 75° to about 300° C. and at least as high as the decomposition temperature of the catalyst, and at a pressure of from about atmospheric to about 100 atmospheres such that a substantial proportion of the reactants is in the liquid phase.

10. A process which comprises forming a mixture of reactants consisting of tetrachloroethylene, an alkyl benzene hydrocarbon having only alkyl substitution and having at least one hydrogen atom attached to the carbon atom of the alkyl group which is attached to a nuclear carbon atom, and an organic peroxide catalyst, and reacting the tetrachloroethylene with said hydrocarbon by heating said mixture to a condensation temperature of from about 75° to about 300° C. and at least as high as the decomposition temperature of the catalyst, and at a pressure of from about atmospheric to about 100 atmospheres such that a substantial proportion of the reactants is in the liquid phase.

11. A process for the preparation of (3-chloroallyl)-benzene which comprises forming a mixture of reactants consisting of trans-dichloroethylene, toluene, and di-tert-butyl peroxide, reacting the trans-dichloroethylene with the toluene by heating said mixture to a condensation temperature of from about 130° to about 300° C. and at a pressure of from about 50 to about 100 atmospheres, and recovering the resultant (3-chloroallyl)-benzene.

12. A process for the preparation of (3,3-dichloroallyl)-benzene which comprises forming a reaction mixture consisting of trichloroethylene, toluene, and di-tert-butyl peroxide, and reacting the trichloroethylene with the toluene by heating said mixture to a temperature of from about 130° to about 300° C. and a pressure of from about 50 to about 100 atmospheres, and recovering the resultant (3,3-dichloroallyl)-benzene.

13. A process for the preparation of (2,3,3-trichloroallyl)-benzene which comprises forming a mixture of reactants consisting of tetrachloroethylene, toluene, and di-tert-butyl peroxide, and reacting the tetrachloroethylene with the toluene by heating said mixture to a temperature of from about 130° to about 300° C. and a pressure of from about 50 to about 100 atmospheres, and recovering the resultant (2,3,3-trichloroallyl)-benzene.

14. A process for the preparation of 1-chloro-3-phenyl-1-butene which comprises forming a mixture of reactants consisting of trans-dichloroethylene, ethylbenzene, and di-tert-butyl peroxide, and reacting the trans-dichloroethylene with the ethylbenzene by heating said mixture to a temperature of from about 130° to about 300° C. and a pressure of from about 50 to about 100 atmospheres, and recovering the resultant 1-chloro-3-phenyl-1-butene.

15. A process for the preparation of 1,1-dichloro-3-phenyl-1-butene which comprises forming a mixture of reactants consisting of trichloroethylene, ethylbenzene, and di-tert-butyl peroxide, reacting the trichloroethylene with the ethylbenzene by heating said mixture to a temperature of from about 130° to about 300° C. and a pressure of from about 50 to about 100 atmospheres, and recovering the resultant 1,1-dichloro-3-phenyl-1-butene.

16. The process of claim 1 further characterized in that said aromatic hydrocarbon is an alkyl benzene having only alkyl substitution.

17. The process of claim 4 further characterized in that said aromatic hydrocarbon is an alkyl benzene having only alkyl substitution.

References Cited in the file of this patent

UNITED STATES PATENTS

| | | |
|---|---|---|
| 2,160,932 | Wiley | June 6, 1939 |
| 2,384,400 | Rummelsburg | Sept. 5, 1945 |
| 2,408,402 | Arnold | Oct. 1, 1946 |
| 2,433,844 | Hanford | Jan. 6, 1948 |
| 2,450,099 | Thompson | Sept. 28, 1948 |
| 2,548,803 | Little | Apr. 10, 1951 |
| 2,552,980 | Ladd et al. | May 15, 1951 |
| 2,554,533 | Ladd | May 29, 1951 |
| 2,660,610 | Erchak | Nov. 24, 1953 |